(No Model.)  2 Sheets—Sheet 1.

J. BLACKADDER.
SHIPPING DEVICE.

No. 251,403. Patented Dec. 27, 1881.

Attest,
W. H. Knight
F. H. Knight

Inventor,
John Blackadder,
by Abraham & Mayer,
his attorneys.

(No Model.)  2 Sheets—Sheet 2.
J. BLACKADDER.
SHIPPING DEVICE.
No. 251,403.  Patented Dec. 27, 1881.
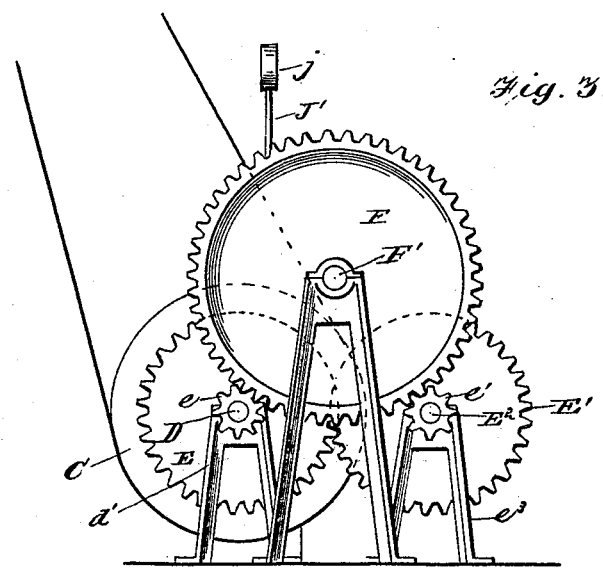
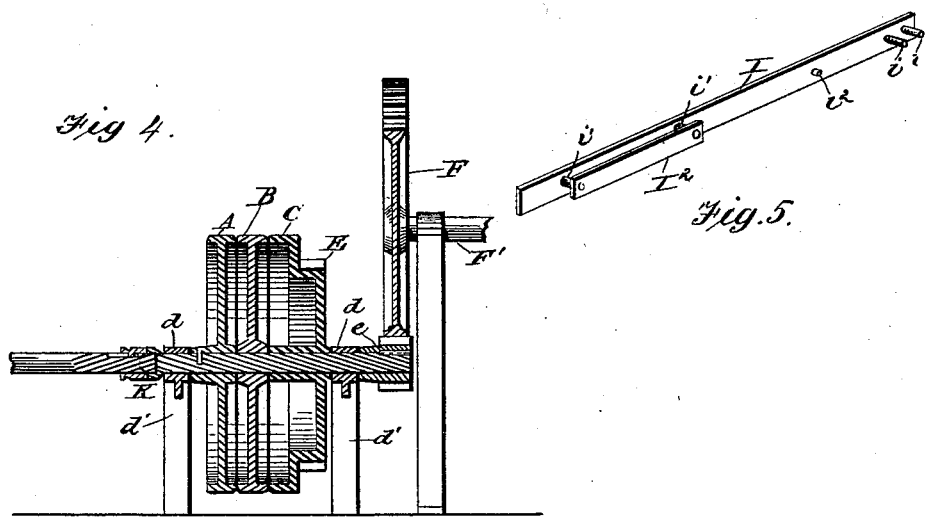
Attest,
W. H. Knight
F. H. Knight
Inventor,
John Blackadder
by Abraham + Mayer
his attorneys

UNITED STATES PATENT OFFICE.

JOHN BLACKADDER, OF NEW ORLEANS, LOUISIANA, ASSIGNOR TO THE TALLOW OIL AND FERTILIZING COMPANY, OF SAME PLACE.

SHIPPING DEVICE.

SPECIFICATION forming part of Letters Patent No. 251,403, dated December 27, 1881.

Application filed November 7, 1881. (No model.)

*To all whom it may concern:*

Be it known that I, JOHN BLACKADDER, a citizen of the United States, residing at New Orleans, in the parish of Orleans and State of Louisiana, have invented a new and useful Improvement in Shipping Devices, of which the following is a specification.

My invention has for its object the provision of means whereby the alternate or reverse motion of machinery—such as planers, lathes, mixing and drying machines, and analogous devices—can be effected without the use of supplemental or cross belts. In ordinary devices of this character such reversed motion is accomplished by means of two belts or wrapping-conductors, one of which is crossed and one of which runs on a loose pulley on the driving-shaft, such loose pulley being thrown into or out of motion by means of clutches upon the shaft. This alternation is not always effected at the proper time, thereby giving an undue strain to machinery, causing disarrangement or breakage.

To obviate these objectionable features, and at the same time to provide an automatic shipping device wherein such reversal of motion shall be accomplished at the proper moment, has been the object of my invention; and to the accomplishment of this end it consists in a series of pulleys, preferably three, mounted upon a shaft journaled in suitable bearings, said shaft having a portion of its length screw-threaded, two of the pulleys being loose, and all being operated by one and the same belt and in the same direction, and in means whereby the belt or wrapping-conductor may be changed from one to the other of said pulleys.

It further consists in a series of spur-wheels and pinions, one of said spur-wheels being rigidly attached to one of the driving-pulleys, and adapted, in connection with the remaining intermeshing series of gear-wheels, to change or reverse the motion of machinery.

It further consists in a vertical swinging lever operated through suitable connections by the screw-threaded shaft, said lever alternately throwing the shipper from side to side; and, finally, it consists in the construction, arrangement, and operation of the various parts as a whole, all substantially as hereinafter described.

Figure 1:
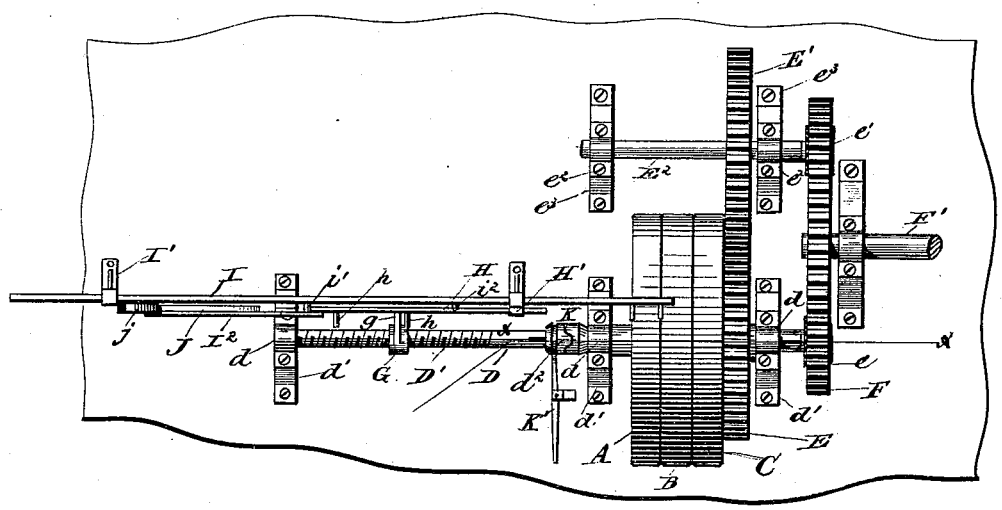
Figure 2:
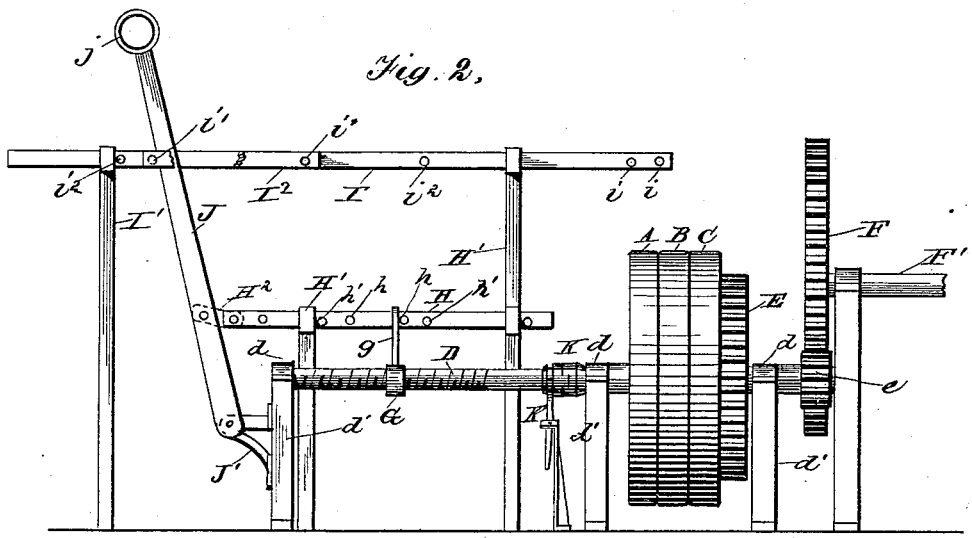

In the drawings, Figure 1 represents a top plan of my improved shipping device; Fig. 2, a side elevation of the same; Fig. 3, an end view; Fig. 4, a longitudinal section on the line $x\ x$, Fig. 1; Fig. 5, detached parts in detail.

Similar letters of reference represent like parts in each figure.

A B C represent pulleys mounted on a shaft, D, journaled in suitable boxes, $d$, attached to bearings $d'$. Two of said pulleys, B C, are loose upon the shaft D, and one of said pulleys, C, carries a spur-wheel, E, said spur-wheel engaging with and rotating a similar spur-wheel, E', mounted upon a short counter-shaft, $E^2$, journaled in boxes $e^2$ on suitable bearings, $e^3$.

To one end of each of the shafts D $E^2$ are attached pinions $e\ e'$, which engage with and rotate a spur-wheel, F, mounted upon a shaft, F', journaled in suitable bearings, said shaft F' representing the driving-shaft of the machinery. A portion of the shaft D is screw-threaded, and carries a nut, G, having an upward-extending arm, $g$, which alternately engages with pins $h$ upon a sliding bar, H, moving to and fro in boxes upon standards H'. One end of the bar H is connected by means of a link, $H^2$, with a vertical swinging lever, J, pivoted at its lower end to a bracket, J', attached to the bearing $d'$. The upper free end of the swinging lever J carries a weight, $j$, said weight operating to throw the lever J quickly from side to side whenever it is diverged from a line vertical to the center of gravity, for a purpose as hereinafter described.

I represents a shipping-bar moving to and fro in suitable boxes on the standards H' I', and provided at one end with belt-shipping pins $i\ i$.

To one side of the shipper-bar I is attached, by means of projecting studs $i'$, a second short bar, $I^2$. Within the inclosed space formed by the bars I $I^2$ and studs $i'$ the vertical lever J moves to and fro.

It will be readily seen by the above-described construction that when the lever J is thrown from side to side it will impinge upon or against one or the other of the studs $i'$, thus causing the bar I to move longitudinally in its bearings, and transfer the belt from one to the other of the pulleys. The longitudinal movement of the shipper-bar is limited by stops $i^2$, thus insuring the proper location of the belts upon the pulleys.

The shaft D is in two parts, united by a clutch, K, operated by a lever, K'. When desired, the screw-threaded portion of said shaft may be thrown out of engagement with the constantly-revolving portion of the shaft D, thus throwing the shipping device out of operation and allowing the machinery to move constantly in one direction.

In order that the belts may be shipped at greater or less intervals of time, I provide a series of apertures or holes, $h'$, in the bar H. It will be readily seen that when the pins $h$ are moved from one to the other of the apertures or holes $h'$ the arm $g$ upon the nut G will consequently be caused to travel a greater or less distance before impinging against said pins, thus regulating the lateral motion of the bar H.

It will be seen from the foregoing description that the pulleys A C will be caused, through the spur-wheels and pinions, to move in opposite directions, and when the belt is changed from one to the other of said pulleys the nut G is caused to move forward or back on the screw-threaded bar D, thus operating the shipping devices, as hereinbefore described.

What I claim is—

1. In an automatic shipping device, the combination of the pulleys A, B, and C, screw-threaded shaft D, nut G, having arms $g$, bar H, having pins $h$, with the link $H^2$, vertical swinging lever J, and shipping-bar I, substantially as described.

2. In an automatic shipping device, the combination of the pulleys A, B, and C, two of said pulleys loosely mounted on the screw-threaded shaft D, and one of said pulleys, C, having spur-wheel E rigidly attached thereto, with the spur-wheel E', mounted on a shaft, $E^2$, pinions $e$ $e'$, and spur-wheels F, mounted on the shaft F' of the driven machinery, substantially as described.

3. In an automatic shipping device, the spur-wheels F, E', and E, pinions $e$ and $e'$, one of said spur-wheels, E, rigidly attached to loose pulley C, in combination with the idler B, fixed pulley A, screw-threaded shaft D, and belt-shipping bars H and I, substantially as described.

JOHN BLACKADDER.

Witnesses:
WILLIAM WEHLE,
MAX DINKELSPIEL.